(12) United States Patent
Tokumoto et al.

(10) Patent No.: US 7,562,590 B2
(45) Date of Patent: Jul. 21, 2009

(54) TORQUE DETECTING DEVICE AND MANUFACTURING METHOD OF YOKE ASSEMBLY

(75) Inventors: Yoshitomo Tokumoto, Mie (JP); Masashi Hashiya, Mie (JP); Tadashi Kitahata, Mie (JP)

(73) Assignees: JTEKT Corporation, Osaka (JP); Nakanishi Metal Works, Co., Ltd., Osaka (JP)

( * ) Notice: Subject to any disclaimer, the term of this patent is extended or adjusted under 35 U.S.C. 154(b) by 0 days.

(21) Appl. No.: 11/765,893

(22) Filed: Jun. 20, 2007

(65) Prior Publication Data

US 2007/0295109 A1 Dec. 27, 2007

(30) Foreign Application Priority Data

Jun. 23, 2006 (JP) .............................. 2006-173614

(51) Int. Cl.
*H02K 15/00* (2006.01)
*H02K 1/04* (2006.01)
*H02K 1/12* (2006.01)
*G01L 3/00* (2006.01)

(52) U.S. Cl. .................... 73/862.331; 29/596; 310/257; 310/43; 73/862.325

(58) Field of Classification Search ................................ 73/862.331–862.335; 29/596, 732, 598; 310/257–259, 43, 45, 179, 194, 216, 218
See application file for complete search history.

(56) References Cited

U.S. PATENT DOCUMENTS 5,829,119 A * 11/1998 Matsushita et al. ............. 29/596

| 6,396,189 | B1 * | 5/2002 | Matsushita et al. ............ 310/257 |
| 6,880,411 | B2 | 4/2005 | Nakane et al. |
| 6,928,888 | B2 * | 8/2005 | Nakane et al. .......... 73/862.332 |
| 7,293,472 | B2 * | 11/2007 | Tokumoto et al. ....... 73/862.331 |
| 2004/0070113 | A1 | 4/2004 | Ilse et al. |
| 2004/0100161 | A1 * | 5/2004 | Matsushita et al. .......... 310/257 |
| 2006/0156834 | A1 * | 7/2006 | Tokumoto et al. ....... 73/862.331 |
| 2006/0208601 | A1 * | 9/2006 | Enomoto et al. ............ 310/257 |
| 2006/0279160 | A1 * | 12/2006 | Yoshinaga et al. .......... 310/216 |

FOREIGN PATENT DOCUMENTS

| EP | 1271108 | 1/2003 |
| JP | 08-048570 A | 2/1996 |
| JP | 2002-340704 | 11/2002 |
| JP | 2003-083825 A | 3/2003 |
| JP | 2003-149062 A | 5/2003 |

OTHER PUBLICATIONS

"Taper pin." McGraw-Hill Encyclopedia of Science and Technology. The McGraw-Hill Companies, Inc., 2005. Answers.com Aug. 7, 2008. http://www.answers.com/topic/taper-pin.*

* cited by examiner

*Primary Examiner*—Lisa M Caputo
*Assistant Examiner*—Jonathan Dunlap
(74) *Attorney, Agent, or Firm*—Darby & Darby PC

(57) ABSTRACT

A yoke assembly is constructed by retaining integrally a yoke ring having positioning holes aligned with pole claws arranged equally on the inner circumference and a yoke ring having positioning holes aligned with the space between pole claws arranged equally on the inner circumference by a retaining cylinder made of a resin. The retaining cylinder has a pin hole remaining after pulling out a common positioning pin inserted into the positioning holes during molding.

8 Claims, 10 Drawing Sheets

TORQUE DETECTING DEVICE AND MANUFACTURING METHOD OF YOKE ASSEMBLY

CROSS-REFERENCE TO RELATED APPLICATION

This non-provisional application claims priority under 35 U.S.C. §119(a) on Patent Application No. 2006-173614 filed in Japan on Jun. 23, 2006, the entire contents of which are hereby incorporated by reference.

BACKGROUND

1. Technical Field

The present invention relates to a torque detecting device for detecting rotational torque applied to a rotary shaft, and a manufacturing method of a yoke assembly for use in the torque detecting device.

2. Description of Related Art

An electric power steering apparatus which assists steering by driving a steering assist motor according to the rotating operation of a steering member, such as a steering wheel, and applying the torque of the motor to a steering mechanism comprises a torque detecting device for detecting the steering torque applied to the steering member for use in the drive control of the steering assist motor. In this torque detecting device, a steering shaft (rotary shaft) connecting the steering member and the steering mechanism is divided into a first shaft and a second shaft which are connected together coaxially with a small-diameter torsion bar, and the steering torque (rotational torque) applied to the steering shaft by the operation of the steering member is detected using a relative angular displacement caused between the first and second shafts with the torsion of the torsion bar.

Conventionally, the relative angular displacement between the first and second shafts is detected by various means. One of the means is a torque detecting device including a cylindrical magnet which rotates together with the first shaft, and one set of two yoke rings which surround the outside of the cylindrical magnet and rotates together with the second shaft, and constructed to detect the relative angular displacement by using a change in a magnetic circuit formed between the yoke rings and the cylindrical magnet (see, for example, Japanese Patent Application Laid-Open No. 2003-149062).

The cylindrical magnet is constructed as a multi-polar magnet including a plurality of N poles and S poles arranged alternately by integrally retaining a plurality of rectangular magnet pieces in a retaining cylinder made of a resin molded in the shape of a cylinder, and externally fitted and fixed on the first shaft via the retaining cylinder. The two yoke rings are thin rings made of a soft magnetic material. On the inner circumference of each yoke ring, the same number of pole claws as the number of the magnetic poles of the cylindrical magnet are arranged equally in a circumferential direction and extended toward one side in an axial direction. These yoke rings are placed so that the extending sides of the respective pole claws face each other and that the respective pole claws are arranged alternately at equal intervals in a circumferential direction. The yoke rings are integrated while keeping this state with a retaining cylinder made of a resin molded in the shape of a cylinder to form a yoke assembly, and the yoke assembly is externally fitted and fixed on an end of the second shaft on the connected side via a metal collar integrally molded into one side of the retaining cylinder.

The cylindrical magnet and the yoke assembly thus fixed are mounted so that the pole claws of the two yoke rings aligned and exposed at the inner circumferential surface of the retaining cylinder are aligned respectively with the boundaries of N poles and S poles on the external circumferential surface of the cylindrical magnet. Therefore, when a relative angular displacement is caused between the first and second shafts by the application of steering torque to the steering shaft, the positional relationships in the circumferential direction between the pole claws of the two yoke rings and the magnetic poles of the cylindrical magnet change mutually in opposite directions. Since the magnetic flux generated in the two yoke rings changes according to this positional change, it is possible to find the steering torque by detecting the change in the magnetic flux.

SUMMARY

The yoke assembly in a torque detecting device as described above is manufactured through the process of positioning two yoke rings and a securing collar in a mold, putting and solidifying a resin in the mold, and molding a retaining cylinder for retaining integrally the yoke rings and the collar. When manufacturing the yoke assembly, the two yoke rings in the mold must be accurately positioned in a circumferential direction so that the pole claws arranged equally on the inner circumference of each of the yoke rings are arranged alternately at mutually equal intervals. The positioning is conventionally carried out through the process of placing two yoke rings in a mold, inserting a gauge with a predetermined width from above the circumference into the space between adjacent pole claws arranged on the circumference of the two yoke rings, and securing the interval corresponding to the width of the gauge between the pole claws.

However, when such positioning is carried out, there is a possibility that the yoke rings may be pushed by the gauge inserted between the pole claws, and the positions of the yoke rings may be displaced in a radial direction. If the retaining cylinder is molded in this condition, it is impossible to maintain the concentricity of the retaining cylinder and the yoke rings, and there may occur a molding defective in which a part of the pole claws arranged on the inner circumference of the yoke ring is covered with the resin for molding the retaining cylinder and is not exposed at the inner circumferential surface of the retaining cylinder.

When such a molding defective is used as it is, the occurrence of magnetic flux change is interfered, and the accuracy of detecting the steering torque is decreased. Therefore, it is essential to perform the finishing operation of grinding the inner surface to expose the covered pole claws after completing the molding of the retaining cylinder, and there is a problem that the number of the steps of manufacturing a yoke assembly and a torque detecting device comprising the yoke assembly is increased.

With the aim of solving the above problems, it is an object to provide a manufacturing method of a yoke assembly capable of preventing molding defectives by certainly and easily performing the positioning of the yoke rings in a mold for the retaining cylinder, and to provide a torque detecting device capable of performing highly accurate detection with the use of this yoke assembly.

A torque detecting device according to a first aspect is a torque detecting device comprising: a yoke assembly constructed by positioning one set of two yoke rings having a plurality of pole claws arranged equally on an inner circumference thereof, said yoke rings including a yoke ring having a positioning hole passing through the yoke ring in an axial direction at a position aligned with the pole claw and a yoke ring having a positioning hole passing through the yoke ring in an axial direction at a position aligned with a space between adjacent pole claws, so that said pole claws are arranged alternately, and retaining integrally said yoke rings with a retaining cylinder made of a resin and having a pin hole extending in an axial direction and connecting the positioning holes of said two yoke rings to each other; and a cylindrical magnet having a plurality of magnetic poles arranged on an outer circumference thereof, wherein said cylindrical magnet and said yoke assembly are fixed respectively to a first shaft and a second shaft connected coaxially to each other, and rotational torque applied to said first shaft and second shaft is detected based on a change in magnetic flux generated in each of said yoke rings according to a relative angle displacement in a magnetic field produced by said cylindrical magnet.

A manufacturing method of a yoke assembly according to a second aspect is a manufacturing method of a yoke assembly, comprising the steps of: positioning one set of two yoke rings having a plurality of pole claws arranged equally on an inner circumference thereof, said yoke rings including a yoke ring having a positioning hole passing through the yoke ring in an axial direction at a position aligned with the pole claw and a yoke ring having a positioning hole passing through the yoke ring in an axial direction at a position aligned with a space between adjacent pole claws, by inserting a common positioning pin provided on a mold into the respective positioning holes so that the pole claws are arranged alternately; and making the yoke assembly by retaining integrally said yoke rings with a retaining cylinder made of a resin molded by filling the mold with the resin.

In the first aspect and the second aspect, the yoke ring having a positioning hole aligned with the position of a pole claw and the yoke ring having a positioning hole aligned with the space between pole claws are used as one set, the positioning of the yoke rings in a mold is carried out by inserting the common positioning pin from the axial direction into the respective positioning holes, and the retaining cylinder is molded in this condition. It is therefore possible to certainly and easily carry out the positioning of the yoke rings in the mold for the retaining cylinder, and it is possible to prevent molding defectives of the yoke assembly. By incorporating the yoke assembly thus manufactured, it is possible to produce advantageous effects, such as it is possible to provide a torque detecting device capable of detecting torque highly accurately.

The above and further objects and features will more fully be apparent from the following detailed description with accompanying drawings.

DETAILED DESCRIPTION

Figure 1:
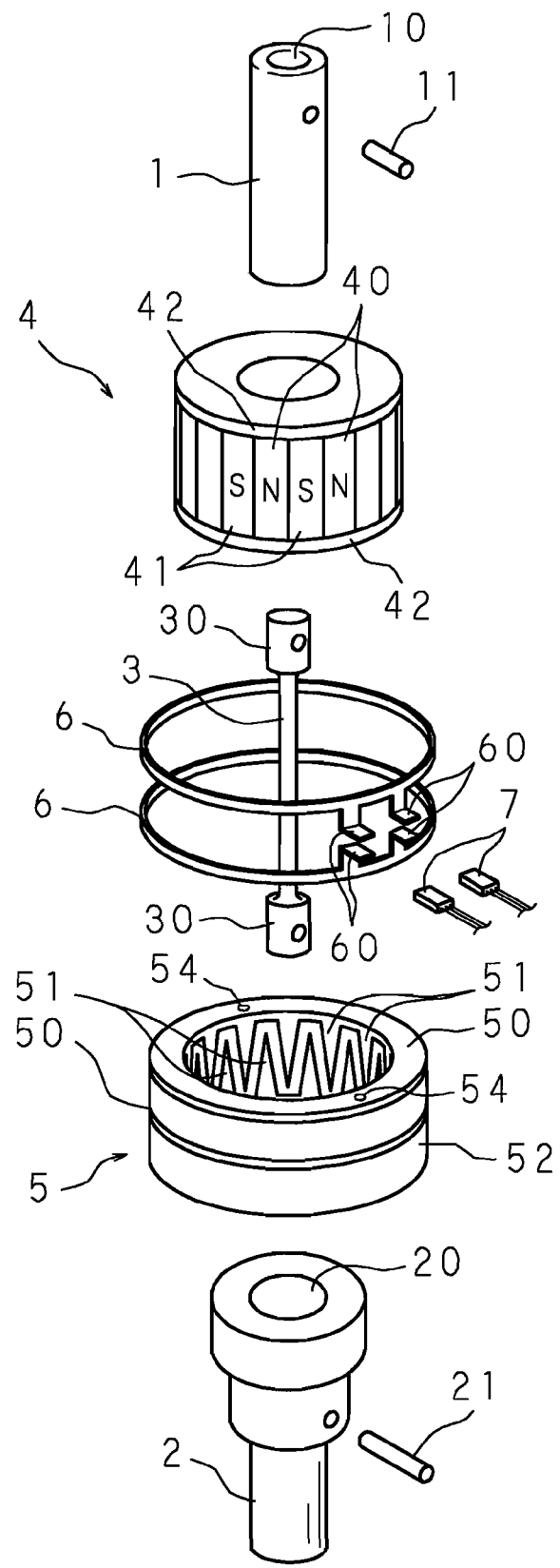
FIG. 1 is an exploded perspective view of a torque detecting device.

The following description will explain an embodiment with reference to the drawings. FIG. 1 is an exploded perspective view of a torque detecting device, and FIG. 2 is a vertical cross sectional view of essential sections showing the assembled state.

The torque detecting device aims to detect rotational torque applied to a first shaft 1 and a second shaft 2 connected coaxially to each other through a torsion bar 3, and comprises a cylindrical magnet 4 which rotates together with the first shaft 1, a yoke assembly 5 which coaxially surrounds the outside of the cylindrical magnet 4 and rotates together with the second shaft 2, magnetism collecting rings 6, 6 for collecting magnetic flux generated in two yoke rings 50, 50 included in the yoke assembly 5, and magnetic sensors 7, 7 placed between the magnetism collecting rings 6, 6 in the manner described later.

The torsion bar 3 comprises large-diameter connection sections 30, 30 on both ends of a small-diameter round bar as a torsion spring. The first shaft 1 and the second shaft 2 are integrated and connected together by fitting the connection sections 30, 30 on both ends of the torsion bar 3 into connection holes 10, 20, respectively, formed in the axial center of the respective shafts, performing positioning as to be described later, and then putting separate connection pins 11 and 21. When rotational torque is applied to the first shaft 1 and second shaft 2 thus connected, the torsion bar 3 is torsionally deformed by the function of the rotational torque, and a relative angular displacement with a magnitude corresponding to the rotational torque is caused in the direction of the rotational torque between the first shaft 1 and the second shaft 2.

Figure 2:
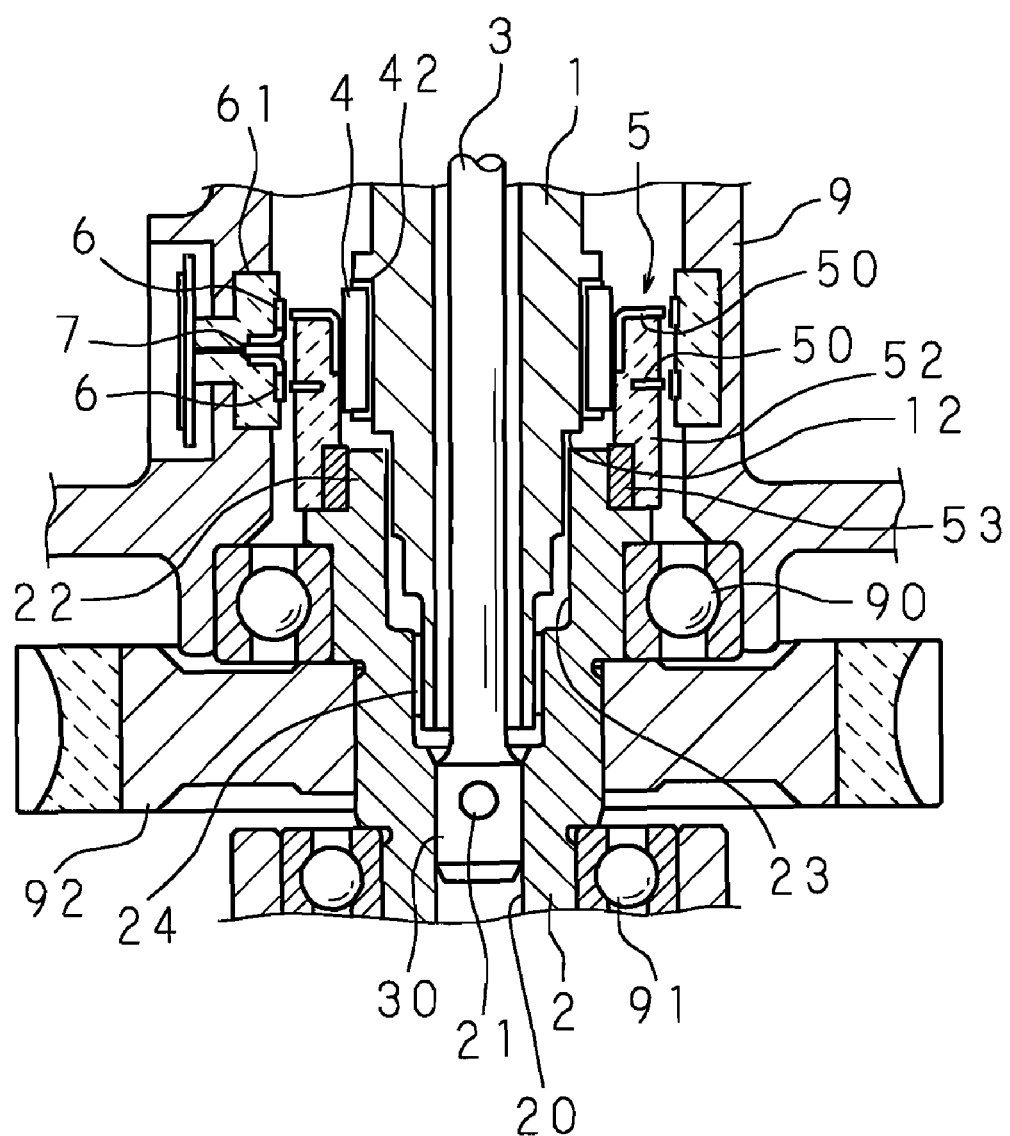
FIG. 2 is a vertical cross sectional view of essential parts showing the assembled state of the torque detecting device.

FIG. 2 shows an application example as means for detecting steering torque applied to a steering shaft that connects a steering member and a steering mechanism in an electric power steering apparatus. The first shaft 1 and the second shaft 2 connected through the torsion bar 3 constitute the steering shaft, and the first shaft 1 located in a higher position is connected to the steering member (not shown), and the second shaft 2 located in a lower position is connected to the steering mechanism (not shown). Note that only the connection section between the torsion bar 3 and the second shaft 2 is shown in FIG. 2.

The second shaft 2 on the steering mechanism side is supported at both ends by two upper and lower bearings 90 and 91 in a housing 9 which is partly shown in FIG. 2, and a worm wheel 92 is fitted and fixed between the bearings 90 and 91. The worm wheel 92 is engaged with a worm (now shown) on an output end of a steering assist motor. When the steering assist motor is driven, the torque generated by the motor is reduced and transmitted to the worm wheel 92, and a steering assist force is applied to the steering mechanism through the second shaft 2.

The second shaft 2 comprises a large-diameter connection cylinder 22 connected to a section above the position supported by the bearing 90, and the connection-side end of the first shaft 1 is inserted by an appropriate length into a support hole 23 which is open in an end face of the connection cylinder 22 and connected to a connection hole 20 of the torsion bar 3, and supported coaxially by a bush 24 which is fitted and fixed in the support hole 23.

As shown in FIG. 1, the cylindrical magnet 4 which rotates together with the first shaft 1 is constructed as a multi-polar magnet by arranging a plurality of N poles 40, 40 . . . and S poles 41, 41 . . . alternately in a circumferential direction and integrating them with a retaining cylinder 42 made of a resin with a suitable thickness for covering the end faces and inner surface. As shown in FIG. 2, the cylindrical magnet 4 is externally fitted and fixed on the first shaft 1 through the retaining cylinder 42.

Figure 3:
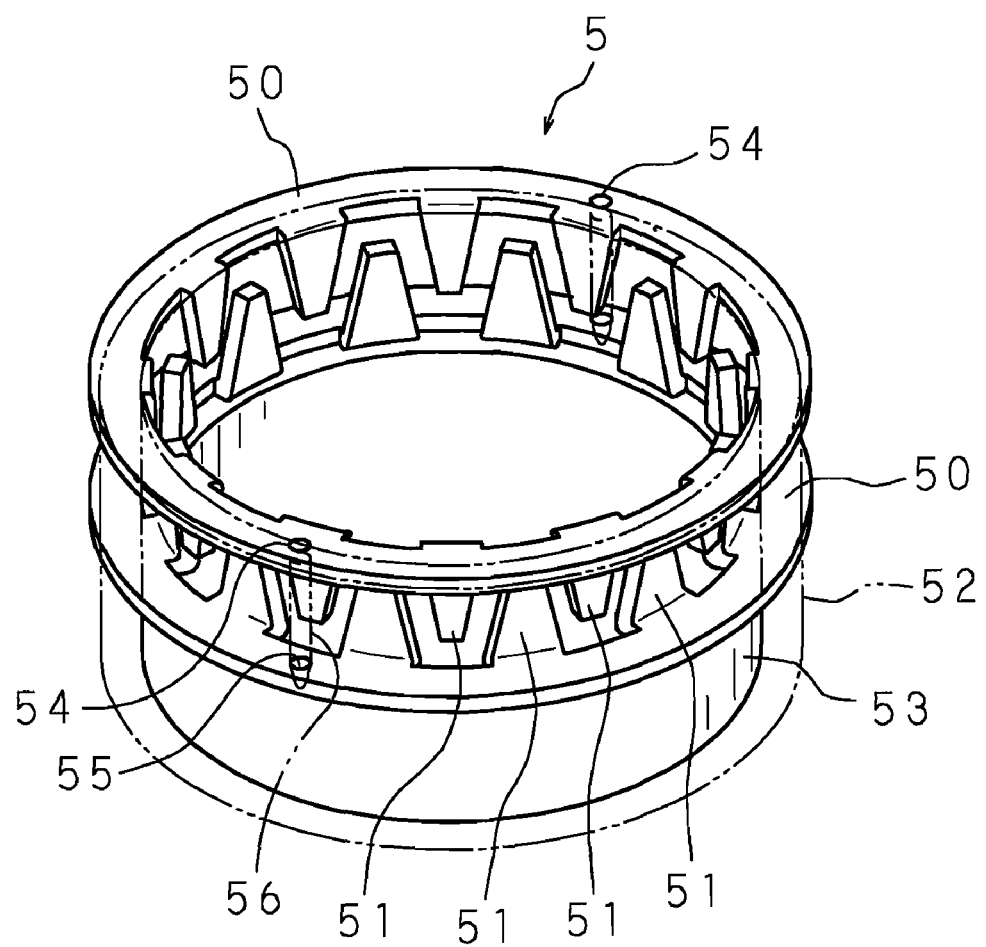
FIG. 3 is a perspective view of a yoke assembly.

The yoke assembly 5 which rotates together with the second shaft 2 comprises one set of two yoke rings 50, 50 as described above and is constructed by retaining the yoke rings 50, 50 with a retaining cylinder 52 molded in the shape of a cylinder. FIG. 3 is a perspective view of the yoke assembly 5, and shows the shapes and positional relationship of the two yoke rings 50, 50 by illustrating the retaining cylinder 52 with an imaginary line.

As shown in FIG. 3, the yoke rings 50, 50 are thin rings made of a soft magnetic material, and each of the yoke rings 50, 50 has pole claws 51, 51 . . . which extend in an axial direction and are arranged equally in a circumferential direction on the inner circumference. Each of the pole claws 51, 51 . . . has a triangular shape whose width is decreased toward the top. The same number of the pole claws 51, 51 . . . as the sets of N and S poles of the cylindrical magnet 4 are provided. The yoke assembly 5 is constructed by placing the above-described two yoke rings 50, 50 coaxially so that the extending sides of the respective pole claws 51, 51 . . . face each other, positioning them as to be described later so that the pole claws 51, 51 . . . are arranged alternately at equal intervals in the circumferential direction, and integrating them with a securing collar 53 placed coaxially on the other side of one yoke ring 50 by the retaining cylinder 52 made of a resin.

Two positioning holes 54, 54 for use in positioning the pole claws 51, 51 . . . are formed in one of the above-described yoke rings 50, 50, and similarly two positioning holes 55, 55 are formed in the other. These positioning holes 54, 54 and 55, 55 are small-diameter circular holes, and formed to go through the respective yoke rings in the thickness direction at mutually facing positions on the circumference of the same axis passing substantially the center in the width direction of the respective yoke rings, 50, 50. The positioning holes 54, 54 and the positioning holes 55, 55 have different positional relationships with the pole claws 51, 51 . . . arranged equally on the inner circumference of the respective yoke rings 50, 50. As shown in FIG. 3, the positioning holes 54, 54 of one yoke ring 50 are provided so that they are aligned with two pole claws 51, 51 located at mutually facing positions, and the positioning holes 55, 55 of the other yoke ring 50 are provided so that they are aligned with the space between two adjacent pole claws 51, 51.

The yoke assembly 5 includes the yoke ring 50 having the positioning holes 54, 54 and the yoke ring 50 having the positioning holes 55, 55 as one set, and is constructed as described above by positioning a plurality of pole claws 51, 51 . . . of the respective yoke rings 50, 50 by arranging the extending sides of the respective pole claws 51, 51 . . . to face each other and determining their positions in a circumferential direction so that the positioning holes 54, 54 and the positioning holes 55, 55 are aligned in a circumferential direction.

The positioning of the yoke rings 50, 50 using the positioning holes 54, 54 and 55, 55, including the positioning of the securing collar 53, is realized as described below inside a mold for use in molding the retaining cylinder 52, and the yoke assembly 5 is manufactured by molding the retaining cylinder 52 in this condition. FIGS. 4 to 8 are explanatory views showing the process of manufacturing the yoke assembly 5.

Figure 4:
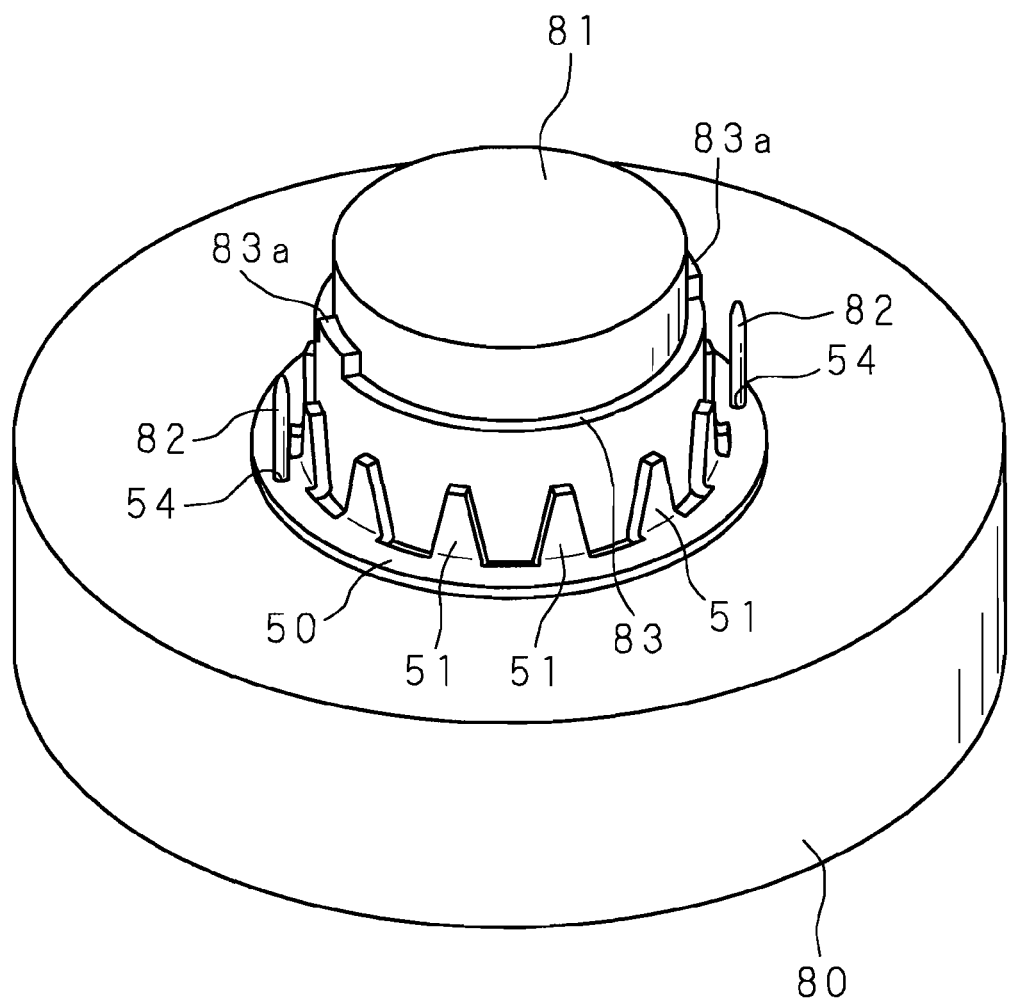
FIG. 4 is an explanatory view showing the process of manufacturing the yoke assembly.

The mold for the retaining cylinder 52 is composed of a combination of a lower mold and an upper mold separable in an axial direction of the retaining cylinder 52, and a pair of intermediate molds separable in a radial direction between the lower and upper molds. As shown in FIG. 4, the lower mold 80 is a thick disk, and comprises a cylindrical center core 81 standing perpendicularly to the center of the upper surface, and a pair of positioning pins 82, 82 which similarly stand perpendicularly to a concentric circumference adjacent to the outer circumference of the center core 81. The center core 81 has an external diameter substantially equal to the internal diameter of the retaining cylinder 52 to be molded, and has a fitting step section 83 for fitting the collar 53 at the top end of the center core 81. The positioning pins 82, 82 are small-diameter circular bars having an external diameter substantially equal to the positioning holes 54, 54 and 55, 55 formed in the yoke rings 50, 50, and are placed at mutually facing positions on the concentric circumference.

As shown in FIG. 4, the yoke ring 50 is placed on the upper surface of the lower mold 80 by fitting it around the center core 81 so that the projecting sides of the pole claws 51, 51 . . . face up and inserting the positioning pins 82, 82 respectively into the positioning holes 54, 54 of the yoke ring 50. The yoke ring 50 thus placed is held immovably in the circumferential direction by the function of the positioning pins 82, 82 inserted into the positioning holes 54, 54, and accurately positioned on the lower mold 80.

Figure 5:
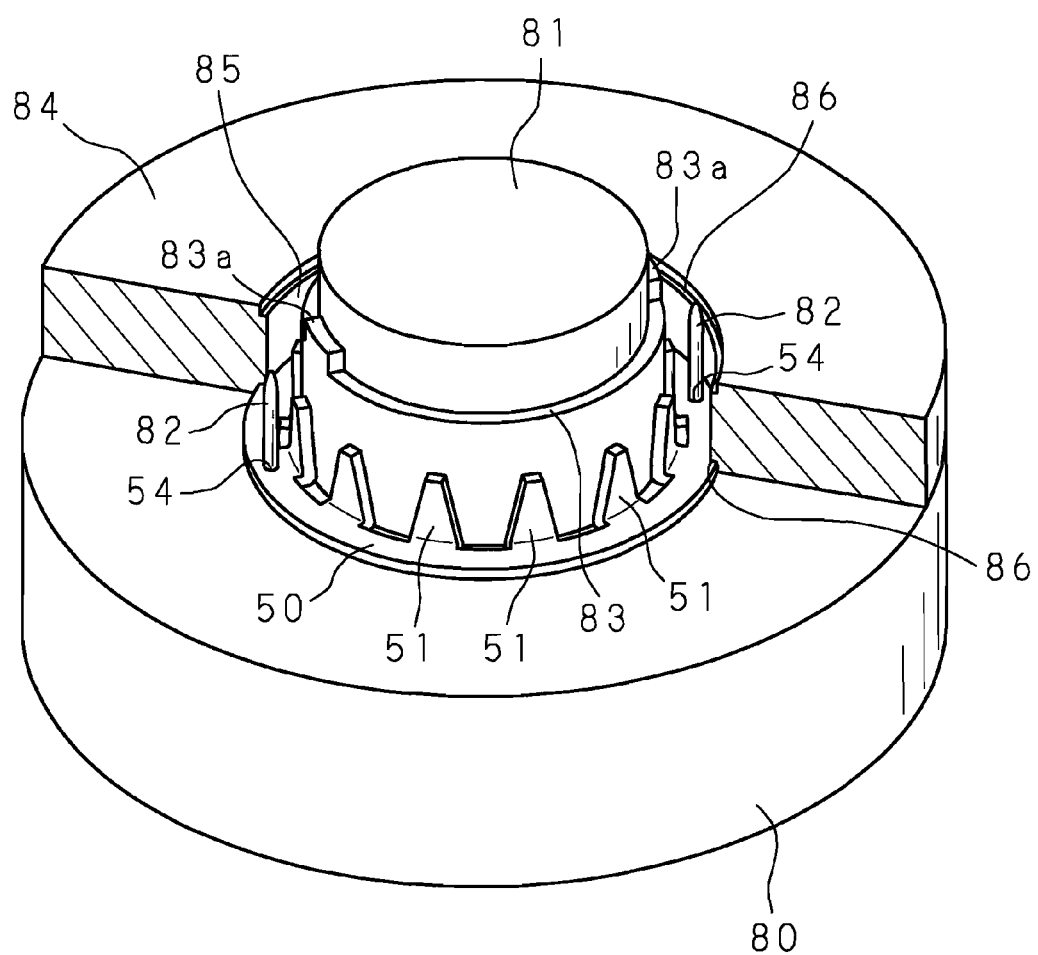
FIG. 5 is an explanatory view showing the process of manufacturing the yoke assembly.

The intermediate molds 84, 84 are semi-circular split molds having a hollow shape 85 corresponding to the external diameter of the retaining cylinder 52 in the middle and capable of being separated in a radial direction. In FIG. 5, only one intermediate mold 84 is shown, and engagement grooves 86, 86, are circumferentially formed in the upper and lower circumferences of the hollow shape 85 in the middle. As shown in FIG. 5, the intermediate mold 84 is placed on the upper surface of the lower mold 80, joined to the other intermediate mold 84 (not shown) on the center of the lower mold 80, and forms a ring-shaped space corresponding to the internal and external diameters of the retaining cylinder 52 between the center core 81 of the lower mold 80 and the intermediate mold 84. At this time, as shown in FIG. 5, the engagement groove 86 formed in the lower circumference of the hollow shape 85 receives the circumference of the yoke ring 50 placed on the lower mold 80 and performs the function of holding the yoke ring 50 with the lower mold 80.

Figure 6:
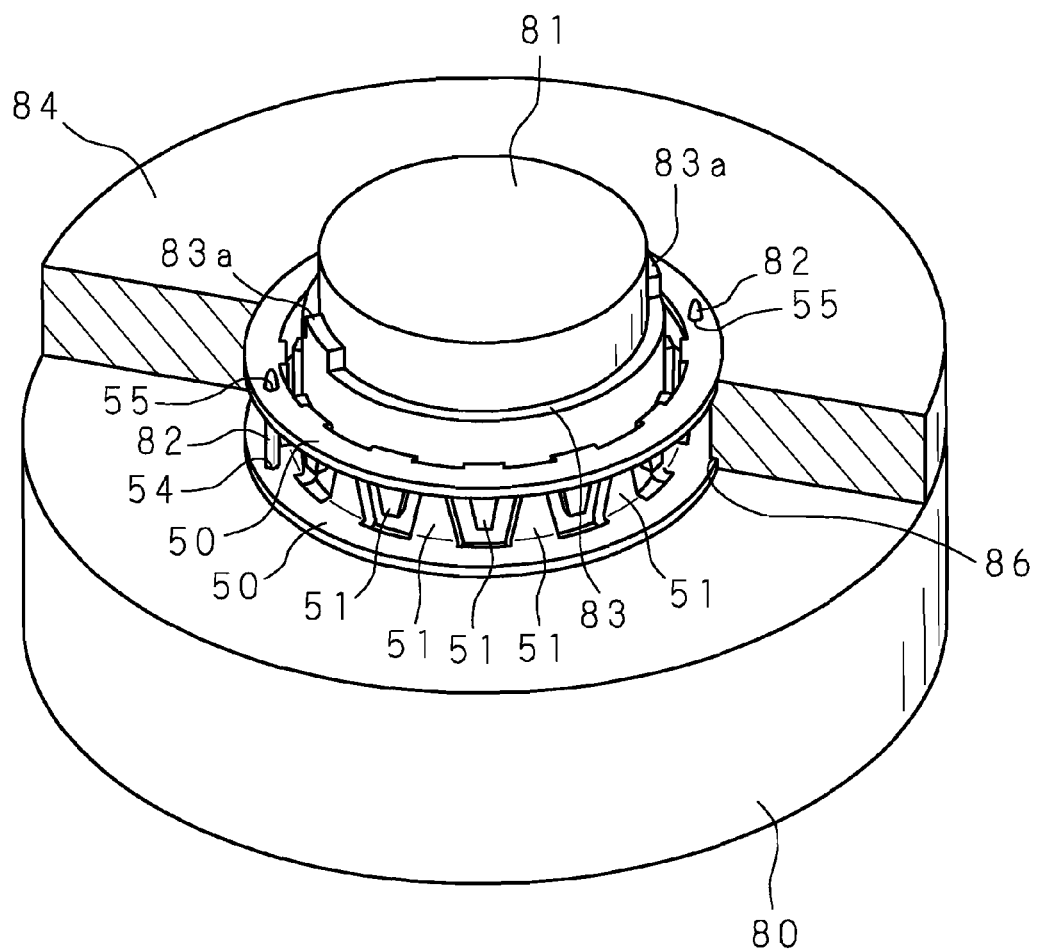
FIG. 6 is an explanatory view showing the process of manufacturing the yoke assembly.

On the other hand, the engagement groove 86 circumferentially formed in the upper circumference of the hollow shape 85 is connected to the engagement groove 86 of the other intermediate mold 84 (not shown) to form a circular bearing for receiving the circumference of the upper yoke ring 50. The ends of the positioning pins 82, 82 projecting from the lower mold 80 stick out further than the upper surface of the intermediate mold 84 by a suitable length. As shown in FIG. 6, the upper yoke ring 50 is placed on the bearing composed of the engagement grooves 86 by fitting the yoke ring 50 around the center core 81 so that the projecting sides of the pole claws 51, 51 . . . face downward and inserting the ends of the respective positioning pins 82, 82 into the positioning holes 55, 55 formed in the yoke ring 50. The upper yoke ring 50 thus placed is held immovably in the circumferential direction by the function of the positioning pins 82, 82 inserted into the positioning holes 55, 55, and positioned apart from the upper surface of the lower mold 80 by an amount corresponding to the thickness of the intermediate mold 84. As shown in FIGS. 4 to 6, the end of each of the positioning pins 82, 82 has a guide section formed in a tapered shape. These guide sections facilitate the insertion into the positioning holes 54, 54 in the lower yoke ring 50 and the positioning holes 55, 55 in the upper yoke ring 50, and perform the function of ensuring the positioning of the upper and lower yoke rings 50, 50.

Here, the positioning holes 54, 54 of the lower yoke ring 50 are provided at positions aligned with the pole claws 51, 51 . . . arranged equally on the inner circumference, and the positioning holes 55, 55 of the upper yoke ring 50 are provided at positions aligned with the space between the pole claws 51, 51 . . . arranged equally on the inner circumference. Since the positioning pin 82 common to these positioning holes 54, 55 is inserted into the holes 54, 55, the upper and lower yoke rings 50, 50 are positioned so that the pole claws 51, 51 . . . of one of the yoke rings 50 is located between the pole claws 51, 51 . . . of the other yoke ring 50 and that the respective pole claws 51, 51 . . . are arranged at equal intervals as shown in FIG. 6. This positioning is certainly realized by the process of placing one yoke ring 50 on the lower mold 80, setting the intermediate molds 84, 84 and then placing the other yoke ring 50 on the intermediate molds 84, 84 as described above.

In the above explanation, although the yoke ring 50 having the positioning holes 54, 54 is referred to as the lower yoke ring and the yoke ring 50 having the positioning holes 55, 55 is referred to as the upper yoke ring, it may be possible to use a different combination in which the yoke ring 50 having the positioning holes 54, 54 is used as the upper yoke ring and the yoke ring 50 having the positioning holes 55, 55 is used as the lower yoke ring.

It is easy to distinguish between the yoke ring 50 having the positioning holes 54, 54 and the yoke ring 50 having the positioning holes 55, 55 by the eye, and the positioning of the yoke rings 50, 50 through the above-described process using such a combination can be carried out simply without paying special attention.

Figure 7:
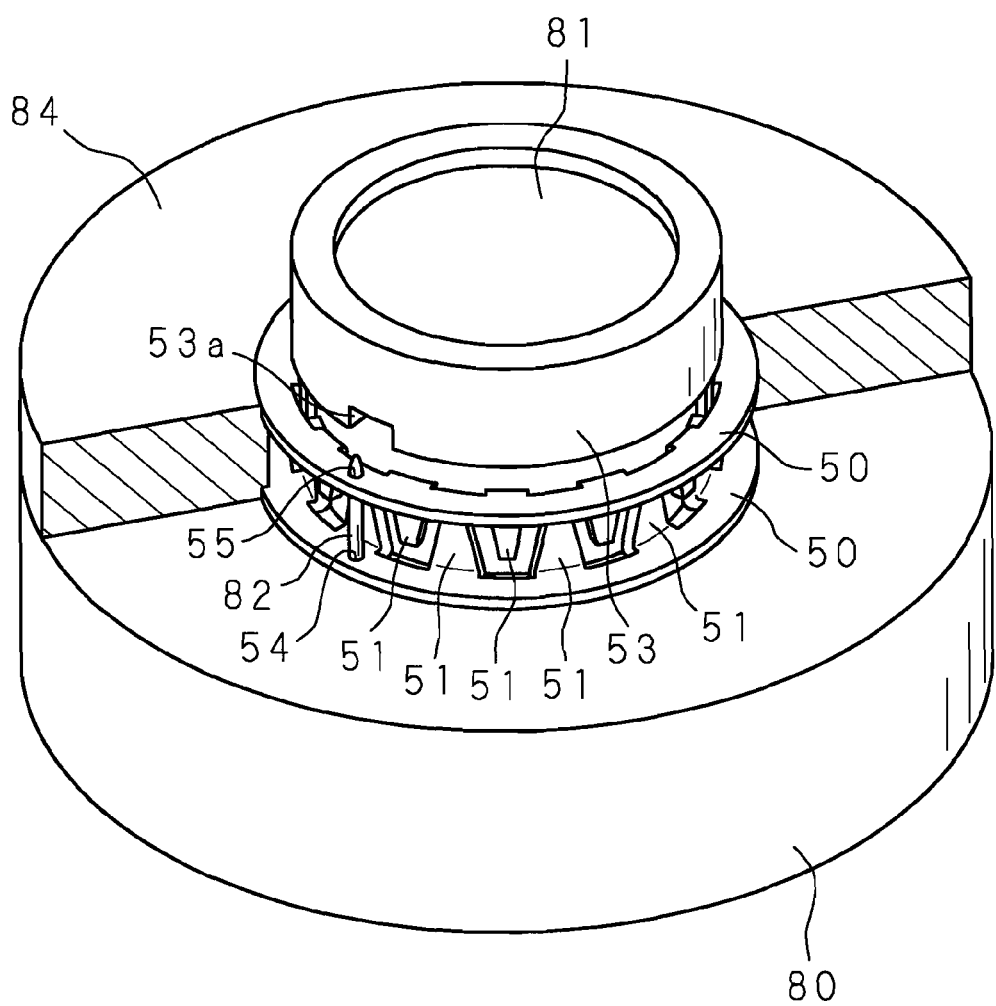
FIG. 7 is an explanatory view showing the process of manufacturing the yoke assembly.

After positioning the upper and lower yoke rings 50, 50 as described above, the securing collar 53 is fitted in the fitting step section 83 provided at the top of the center core 81 as shown in FIG. 7, and positioning is performed by pushing the down-facing end face of the collar 53 against the up-facing end face of the fitting step section 83. A recessed section 53*a* is provided in the down-facing end face of the collar 53 as shown in FIG. 7, and a protruding section 83*a* corresponding to the recessed section 53*a* is provided on the up-facing end face of the fitting step section 83 as shown in FIG. 4. Positioning of the collar 53 is also performed in the circumferential direction by engaging the recessed section 53*a* with the protruding section 83*a*.

Figure 8:
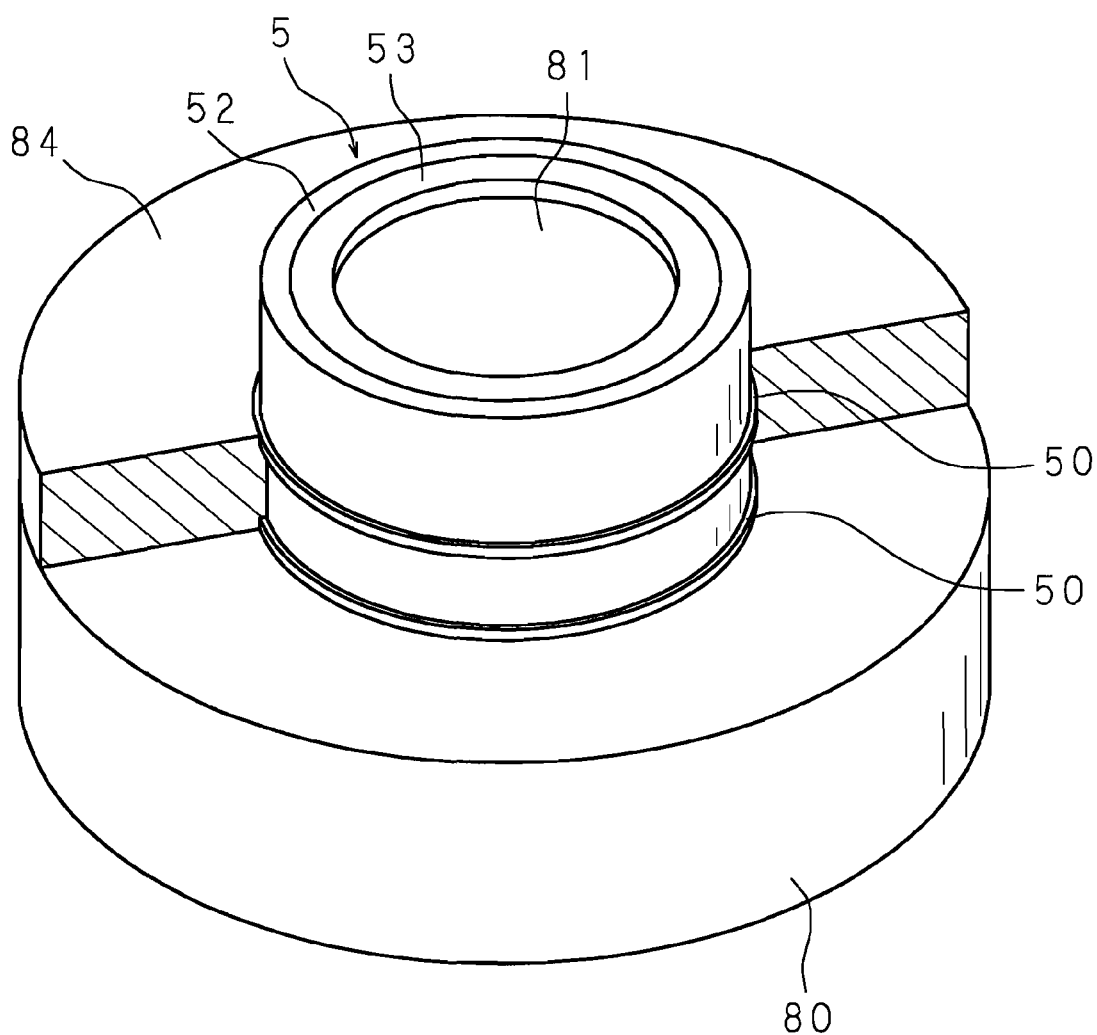
FIG. 8 is an explanatory view showing the process of manufacturing the yoke assembly.

Thereafter, the upper mold (not shown) is set on the intermediate molds 84, 84 and fastened to sandwich the intermediate molds 84, 84 between the upper mold and the lower mold 80, and a resin is put into the ring-shaped space between the upper mold, lower mold 80 and intermediate molds 84, 84 and the center core 81 and solidified to form the retaining cylinder 52. FIG. 8 shows the state where the upper mold and one intermediate mold 84 were removed after molding the retaining cylinder 52. As shown in FIG. 8, the external circumferences of the two yoke rings 50, 50 are exposed with a predetermined distance therebetween in the axial direction at the external circumferential surface of the retaining cylinder 52 made of a resin with an internal diameter equal to the center core 81, and the yoke assembly 5 comprising the securing collar 53 integrated into the inner circumference of the upper end is manufactured.

The yoke assembly 5 is removed by lifting it up and pulling it out from the center core 81 standing on the lower mold 80 and simultaneously pulling the positioning pins 82, 82 out of the positioning holes 54, 54 and 55, 55 of the yoke rings 50, 50. As shown in FIG. 3, the yoke assembly 5 thus manufactured has the positioning holes 54, 54 (or the positioning holes 55, 55) in one yoke ring 50 exposed at an end face. Since pin holes 56, 56 remaining after pulling the positioning pins 82, 82 out of the respective positioning holes 54, 54 run in the axial direction to the inside of the retaining cylinder 52 and are connected to the positioning holes 55, 55 formed in the other yoke ring 50, this yoke assembly 5 is distinguishable from a yoke assembly 5 manufactured by a conventional method.

As described above, positioning of the yoke rings 50, 50 of the yoke assembly 50 is performed by inserting the positioning pins 82, 82 in the axial direction into the respective positioning holes 54, 54 and 55, 55, and the positioning pins 82, 82 also perform the positioning function in the radial direction as well as in the circumferential direction. Therefore, the concentricity of the yoke rings 50, 50 is maintained well during the process of molding the retaining cylinder 52. Thus, the pole claws 51, 51 . . . provided on the respective yoke rings 50, 50 are certainly exposed at equal intervals at the inner circumferential surface of the molded retaining cylinder 52.

As shown in FIG. 2, the yoke assembly 5 thus constructed is externally fitted and fixed on the connection cylinder 22 located on the upper end of the second shaft 2 via the collar 53 integrated into an end of the retaining cylinder 52, and the pole claws 51, 51 . . . of the yoke rings 50, 50 exposed at the inner surface of the retaining cylinder 52 face the external circumferential surface of the cylindrical magnet 4 fitted and fixed around the first shaft 1 with a slight air gap therebetween. The yoke assembly 5 is mounted so that the following positional relationship is established in the circumferential direction.

Figure 9:
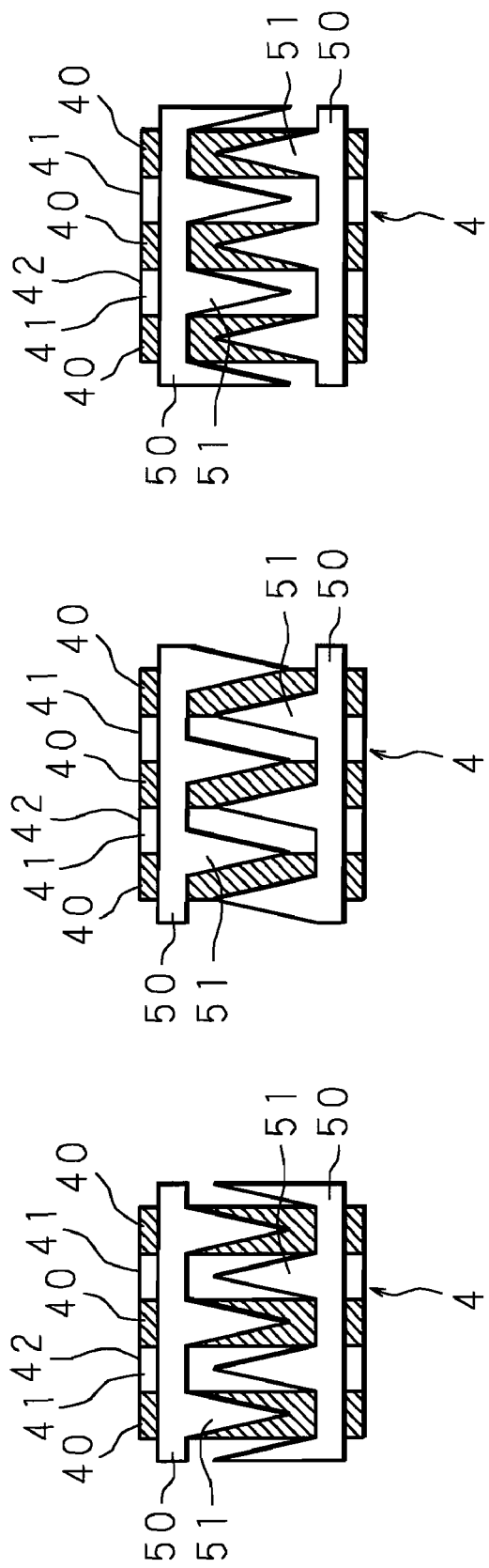
FIGS. 9A to 9C are explanatory views showing the positional relationships between the pole claws of yoke rings and the magnetic poles of a cylindrical magnet.

FIGS. 9A to 9C are explanatory views showing the positional relationships between the pole claws of the yoke ring and the magnetic poles of the cylindrical magnet. FIG. 9B shows the positional relationship in mounting in which positioning of the yoke rings 50, 50 and the cylindrical magnet 4 is performed in the circumferential direction so that each of the pole claws 51, 51 . . . of the yoke rings 50, 50 is aligned with the boundary between the N pole 40 and the S pole 41 arranged on the circumference of the cylindrical magnet 4. At this time, the pole claws 51, 51 . . . of the two yoke rings 50, 50 are positioned under the same condition within a magnetic field produced between mutually adjacent N pole 40 and S pole 41 on the circumference of the cylindrical magnet 4, and equal magnetic flux is generated in the yoke rings 50, 50 connecting the base sections of these pole claws 51, 51 . . . .

The positional relationships between such pole claws 51, 51 . . . and the N pole 40 and the S pole 41 in the circumferential direction change in mutually opposite directions as shown in FIG. 9A or FIG. 9C, according to the relative angle displacement caused with the torsion of the torsion bar 3 between the first shaft 1 to which the cylindrical magnet 4 is fixed and the second shaft 2 to which the yoke assembly 5 is fixed. When this change occurs, lines of magnetic force having opposite polarities increase in the pole claws 51, 51 . . . of one yoke ring 50 and the pole claws 51, 51 . . . of the other yoke ring 50, and positive and negative magnetic fluxes are generated in the respective yoke rings 50, 50.

The positive or negative polarity of magnetic flux generated at this time is determined according to the direction of the relative angle displacement caused between the cylindrical magnet 4 and the yoke assembly 5, that is, between the first shaft 1 and the second shaft 2, and the positive or negative magnetic flux density corresponds to the magnitude of the relative angle displacement. Therefore, by detecting the magnetic flux, it is possible to find the relative angle displacement between the first shaft 1 and the second shaft 2, that is, the rotational torque (steering torque) applied to the first and second shafts.

The magnetic flux thus generated in the yoke rings 50, 50 is collected by separate magnetism collecting rings 6, 6 and detected by the magnetic sensors 7, 7, respectively. The magnetism collecting rings 6, 6 are rings made of a soft magnetic material with an internal diameter slightly larger than the external diameter of the yoke rings 50, 50. As shown in FIG. 1, the magnetism collecting rings 6, 6 have magnetism collecting sections 60, 60 at two corresponding positions in a circumferential direction. Each of the magnetism collecting sections 60, 60 extends in an axial direction and has an end bent outward substantially at a right angle. These magnetism collecting rings 6, 6 are positioned coaxially so that the extending sides of the magnetism collecting sections 60, 60 face each other and that the ends of the respective magnetism collecting sections 60, 60 face each other with a predetermined air gap therebetween in the axial direction. The magnetism collecting rings 6, 6 are integrated by covering the outside thereof with a retaining cylinder 61 made of a resin molded in the shape of a cylinder.

Each of the magnetic sensor 7 is composed of a magnetic detecting element such as the Hall element, placed in the air gap between the ends of the magnetism collecting sections 60, 60, and integrated with the magnetic rings 6, 6 by the retaining cylinder 61 as shown in FIG. 2. The magnetic rings 6, 6 comprise the magnetism collecting sections 60, 60 at two positions in the circumferential direction, and, as shown in FIG. 1, the magnetic sensors 7, 7 are placed in the respective air gaps in the ends of the magnetism collecting sections 60, 60 located at two positions.

As shown in FIG. 2, the retaining cylinder 61 for retaining the magnetism collecting rings 6, 6 and the magnetic sensors 7, 7 in such a manner is fitted and fixed into the housing 9 so that the magnetism collecting rings 6, 6 exposed at the inner surface adjacently face the external circumferences of the two yoke rings 50, 50 of the yoke assembly 5. Thus, the magnetic flux generated in the yoke rings 50, 50 located inside the magnetism collecting rings 6, 6 is inducted and converged into the respective magnetism collecting sections 60, 60, and leaks into the air gap secured therebetween. The magnetic sensors 7, 7 give an output corresponding to the density of leaked magnetic flux.

The magnetic flux density detected as the output of the magnetic sensors 7, 7 changes according to the magnetic flux inside the yoke rings 50, 50 facing the inside of the magnetism collecting rings 6, 6. As described above, since the magnetic flux corresponds to the relative angle displacement between the first shaft 1 and the second shaft 2, the output of the magnetic sensors 7, 7 correspond to the direction and magnitude of the rotational torque which is applied to the first shaft 1 and the second shaft 2, and causes a relative angle displacement. It is therefore possible to detect the rotational torque applied to the first shaft 1 and the second shaft 2 based on the change in the output of the magnetic sensors 7, 7.

The reason why the two magnetic sensors 7, 7 are provided is to use one for detecting torque and the other for fail determination. The fail determination is made by a known process in which, for example, the outputs of the two magnetic sensors 7, 7 are compared in a time series, and, when there is a significant difference between the outputs, a determination is made that the magnetic sensor 7 which shows an unsteady output change before and after the significant difference is in a fail condition.

In the torque detecting device, since the yoke rings 50, 50 of the yoke assembly 5 are integrated in a state in which the respective pole claws 51, 51 ... are arranged at equal intervals in the circumferential direction and good concentricity is secured by the above-mentioning positioning process, a change in the magnetic flux according to the function of the rotational torque applied to the first shaft 1 and the second shaft 2 occurs stably. It is thus possible to highly accurately detect the rotational torque based on a change in the outputs of the magnetic sensors 7, 7.

Although the above-described embodiment explains the case where two positioning holes 54, 54 or 55, 55 are formed in each of the yoke rings 50, 50, the number of the positioning holes is not necessarily limited to two, and may be one or more than two.

In the above-described embodiment, one yoke ring 50 has the positioning holes 54, 54 formed at positions in a circumferential direction aligned with two pole claws 51, 51, respectively, located at mutually facing positions, the other yoke ring 50 has the positioning holes 55, 55 formed to be aligned with the space between two pole claws 51, 51, and one set of the yoke ring 50 having the positioning holes 54, 54 and the yoke ring 50 having the positioning holes 55, 55 is used to construct the yoke assembly 5. However, as shown in FIG. 10, it may be possible to construct the yoke assembly 5 by using two yoke rings 50 having both of the positioning holes 54, 54 and positioning holes 55, 55.

Figure 10:
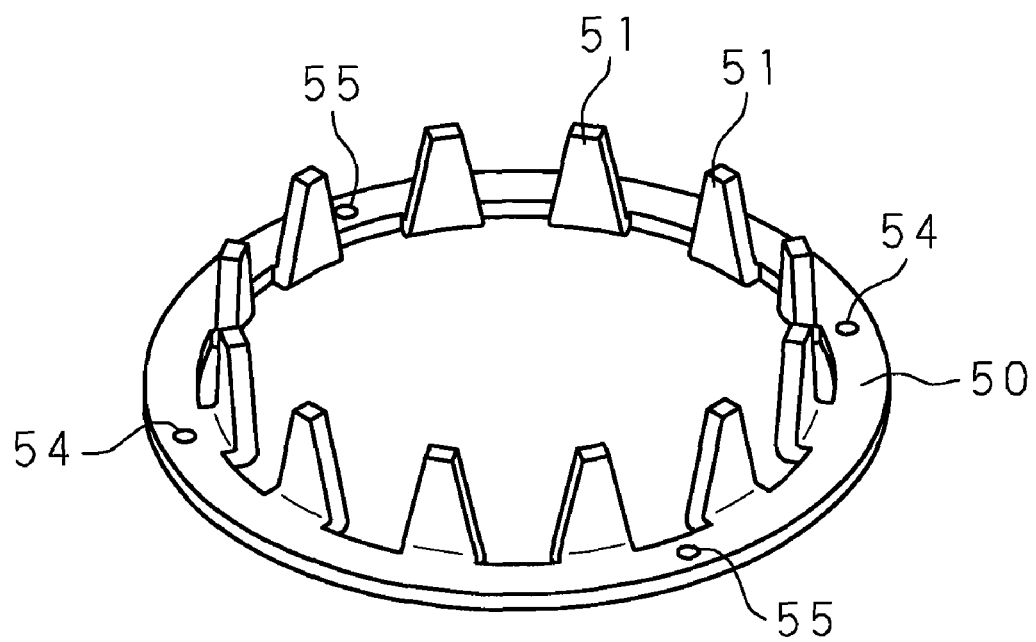
FIG. 10 is an external perspective view of a yoke ring having two kinds of positioning holes.

When carrying out the manufacturing process shown in FIGS. 4 to 8 using the two yoke rings 50 shown in FIG. 10, it may be possible to use only the positioning holes 54, 54 of one yoke ring 50 and only the positioning holes 55, 55 of the other yoke ring 50, and thus it is not necessary to distinguish between the upper and lower yoke rings. Moreover, since only the yoke rings 50 of one kind are used, it is possible to easily manage the parts. Further, since it is possible to share a die in forming the yoke ring 50 by press work including punching the positioning holes 54, 54 and positioning holes 55, 55, a reduction in the manufacturing cost is achieved.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A torque detecting device comprising:
a yoke assembly comprising:
one set of two yoke rings each having a plurality of pole claws, the set of two yoke rings each being positioned so that the plurality of pole claws are arranged equally on an inner circumference thereof, said yoke rings including a first yoke ring having a positioning hole passing through the yoke ring in an axial direction at a position aligned with the pole claw and a second yoke ring having a positioning hole passing through the yoke ring in an axial direction at a position aligned with a space between adjacent pole claws; and
a retaining cylinder made of a resin, molded integrally with the plurality of pole claws and having a pin hole extending in an axial direction, wherein said pole claws of each of said first and second yoke rings are alternatingly arranged along the inner circumference, said retaining cylinder extends fully between said first and second yoke rings and between adjacent ones of said alternatingly arranged pole claws along the inner circumference, and said retaining cylinder is integrally retained by said first and second yoke rings at a predetermined positioning to form said yoke assembly, at which the positioning holes of said first and second yoke rings and the pin hole of the retaining cylinder are connected along a common axis to form an empty, unobstructed hole; and a cylindrical magnet having a plurality of magnetic poles arranged on an outer circumference thereof, wherein said cylindrical magnet and said yoke assembly are fixed respectively to a first shaft and a second shaft connected coaxially to each other, and rotational torque applied to said first shaft and second shaft is detected based on a change in magnetic flux generated in each of said first and second yoke rings according to a relative angle displacement in a magnetic field produced by said cylindrical magnet.

2. The torque detecting device according to claim 1, wherein each of said first and second yoke rings has a plurality of positioning holes.

3. The torque detecting device according to claim 1, the yoke assembly further comprising:
   a securing collar positioned away from said first and second yoke rings in an axial direction of said first and second yoke rings,
   wherein said securing collar is integrally retained with said first and second yoke rings and said retaining cylinder.

4. A torque detecting device comprising:
   a yoke assembly constructed by positioning one set of two yoke rings having a plurality of pole claws arranged equally on an inner circumference thereof, said yoke rings including a first yoke ring having a positioning hole passing through the yoke ring in an axial direction at a position aligned with the pole claw and a second yoke ring having a positioning hole passing through the yoke ring in an axial direction at a position aligned with a space between adjacent pole claws, so that said pole claws are arranged alternately, and retaining integrally said first and second yoke rings at a predetermined positioning with a retaining cylinder made of a resin and having a pin hole extending in an axial direction and connecting the positioning holes of said first and second yoke rings to each other with a common positioning pin inserted into the respective positioning holes and pin hole; and a cylindrical magnet having a plurality of magnetic poles arranged on an outer circumference thereof,
   wherein said cylindrical magnet and said yoke assembly are fixed respectively to a first shaft and a second shaft connected coaxially to each other, and rotational torque applied to said first shaft and second shaft is detected based on a change in magnetic flux generated in each of said first and second yoke rings according to a relative angle displacement in a magnetic field produced by said cylindrical magnet, and
   wherein the first yoke ring having the positioning hole at a position aligned with the pole claw further includes a positioning hole passing through said yoke ring in the axial direction at a position aligned with a space between adjacent pole claws, and the second yoke ring having the positioning hole at a position aligned with a space between adjacent pole claws further includes a positioning hole passing through said yoke ring in the axial direction at a position aligned with the pole claw.

5. A manufacturing method of a yoke assembly, comprising the steps of:
   positioning one set of two yoke rings having a plurality of pole claws arranged equally on an inner circumference thereof, said yoke rings including a first yoke ring having a positioning hole passing through the yoke ring in an axial direction at a position aligned with the pole claw and a second yoke ring having a positioning hole passing through the yoke ring in an axial direction at a position aligned with a space between adjacent pole claws, by inserting a common positioning pin provided on a mold into the respective positioning holes so that the pole claws are arranged alternately; and
   making the yoke assembly by retaining integrally said first and second yoke rings with a retaining cylinder made of a resin molded by filling the mold with the resin.

6. The manufacturing method of a yoke assembly according to claim 5, wherein said mold is capable of being separated into parts.

7. The manufacturing method of a yoke assembly according to claim 5, wherein said positioning pin has a tapered end.

8. The manufacturing method of a yoke assembly according to claim 5, wherein:
   said positioning step further comprises the step of:
      inserting a securing collar on a center core of the mold such that the securing collar is coaxially positioned away from the set of first and second yoke rings in the axial direction; and
   said making step further comprises the step of:
      retaining said yoke ring as positioned integrally with said securing collar and the retaining cylinder made of a resin molded by filling the mold with the resin.

* * * * *